Dec. 21, 1948.  J. P. K. FONTAINE ET AL  2,456,826
TRAILER COUPLER
Filed April 11, 1946  2 Sheets-Sheet 1
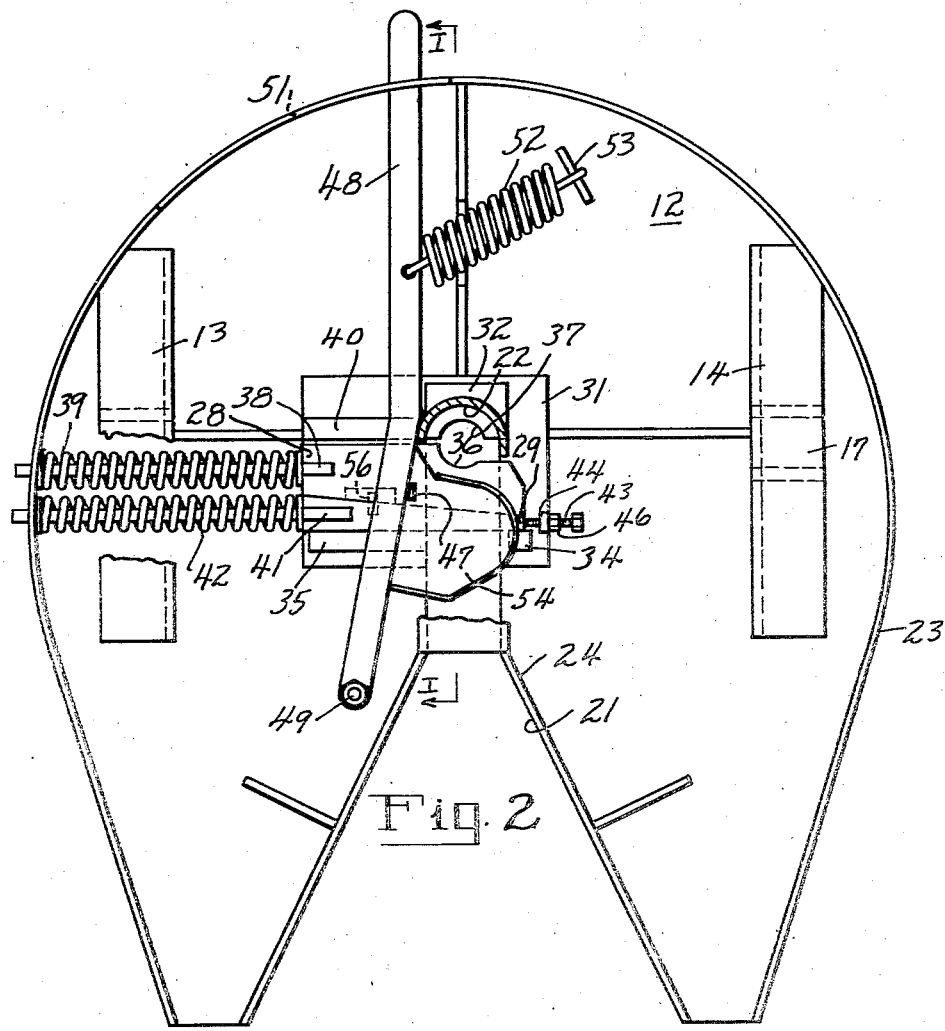
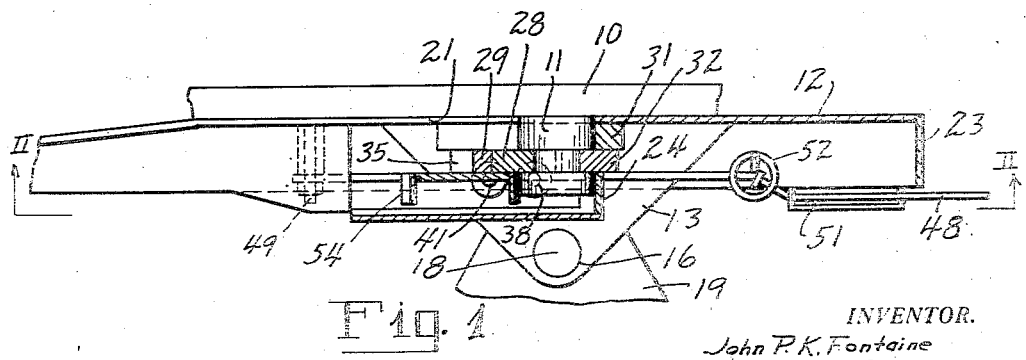
INVENTOR.
John P. K. Fontaine
BY Arnoldus S. Brumby
ATTORNEY Dec. 21, 1948.         J. P. K. FONTAINE ET AL         2,456,826
                          TRAILER COUPLER
Filed April 11, 1946                              2 Sheets-Sheet 2
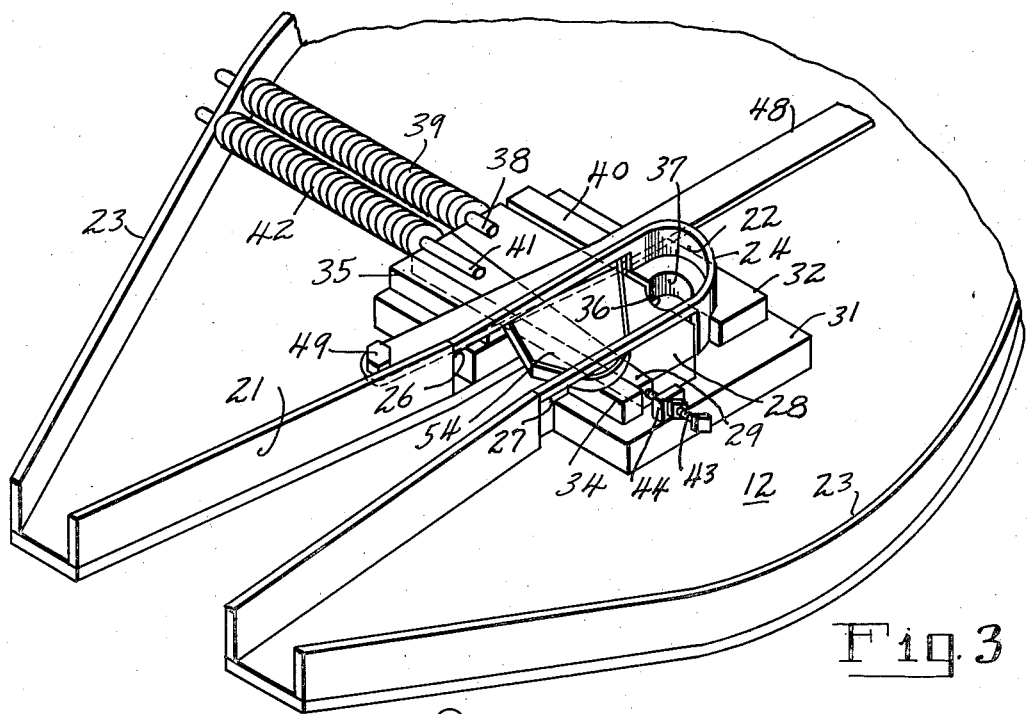
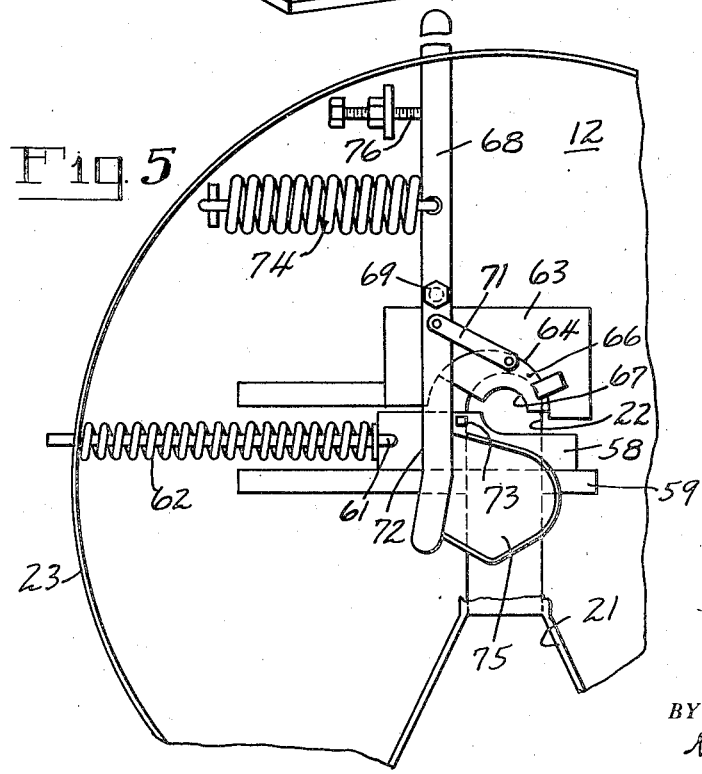
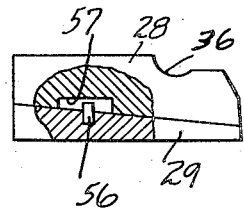
INVENTOR.
John P. K. Fontaine
BY Arnoldus S. Brumby
Henry L. Jennings
ATTORNEY Patented Dec. 21, 1948

2,456,826

UNITED STATES PATENT OFFICE 2,456,826

TRAILER COUPLER

John P. K. Fontaine and Arnoldus S. Brumby, Birmingham, Ala.; said Brumby assignor to said Fontaine Application April 11, 1946, Serial No. 661,227

18 Claims. (Cl. 280—33.05)

1

This invention relates to mechanism for coupling a trailer to a tractor and has for an object the provision of apparatus of the character designated which shall be especially adapted to compensate for wear and minimize slack and lost motion in the coupling mechanism.

A further object of our invention is to provide coupling mechanism including a king pin and a locking member for retaining the king pin when coupled, together with means operable to maintain a minimum of lost motion between the king pin and the locking member.

A more specific object of our invention is to provide a coupling mechanism including a king pin and a locking member to retain the king pin when coupled, together with a wedging member to compensate for wear and take up lost motion between the king pin and the locking member, and means for biasing the wedging member into engagement with the locking member.

Briefly, our invention further comprises the usual fifth wheel plate having a lateral flaring opening terminating at the center in a U-shaped slot. A locking member is mounted to move in the slot to engage and retain the king pin when coupled. The locking member is maintained in engagement, or with a minimum of lost motion with respect to the king pin by means of a wedging member associated with the locking member and biased into wedging position by means of a spring. An operating lever is mounted on the fifth wheel plate and is disposed to engage and move first the wedging member and then the locking member when uncoupling. A cam is mounted on the operating lever in position to be engaged by the king pin when coupling, to move the locking member out of the path of the king pin. Spring means serve to bias both the locking member and the wedging member toward coupled position.

Apparatus embodying features of our invention is illustrated in the accompanying drawings, in which Fig. 1 is a longitudinal section taken along the line I—I of Fig. 2;

Fig. 2 is a bottom plan view, partly in section;

Fig. 3 is a diagrammatic perspective view looking at the under side;

Fig. 4 is a sectional view showing a detail of the apparatus; and

Fig. 5 is a partial plan view showing a modification of our invention.

Referring now to the drawings for a better understanding of our invention, we show in Fig. 1 a fragment of a trailer 10 which has a king pin

2

11 mounted on its under side. As is well understood, the king pin is engaged and retained by the coupling mechanism. Our improved coupling mechanism comprises a fifth wheel plate 12 having lateral brackets 13 and 14 mounted on the under side and providing bearings 16 and 17 for a supporting shaft 18 mounted in brackets 19 on the tractor, not otherwise shown. The fifth wheel plate is provided with a lateral flaring opening 21 which terminates at 22, centrally of the plate, in a U-shaped slot adapted to receive the king pin 11. The outer perimeter of the plate is reinforced by means of a flange 23, and the opening 21 and U-shaped slot 22 by means of a continuous flange 24. The flange 24 is provided with lateral openings 26 and 27 (see Fig. 3) through which extend a locking member 28 and a wedging member 29 transversely of the opening. The inner end of the U-shaped slot 22 is reinforced by means of a relatively heavy block 31 which is welded to the under side of the plate 12 and by a second block 32 which is welded to the block 31 and to the flange 24 and provides a bearing surface for the king pin. Heavy blocks 34, 35 and 40 are welded to the block 31 and act as guides for the wedging member 29, and the locking member 28. The blocks 34 and 35 also act as abutments for the wedge member transmitting the pulling effort from the king pin to the fifth wheel plate. The locking member 28 is provided with an arcuate seat 36 for the king pin when coupled which cooperates with a seat 37 formed in the reinforcing block 32 on the opposite side of the king pin.

A rod 38 is welded onto the locking member 28 and protrudes below the locking member, as best seen in Fig. 3, to provide a boss on the locking member. The rod 38 extends outwardly of the fifth wheel plate through an opening in the outer flange 23 and is surrounded by a relatively heavy spring 39 which biases the locking member toward the position shown in the drawings. A similar rod 41 is welded onto the wedge member 29 and extends outwardly of the fifth wheel plate through the flange 23. The rod 41 is surrounded by a relatively heavy spring 42 which biases it into engagement with the locking member 28 and into wedging position, as shown in Fig. 2. The extent of inward movement of the wedge member 29 may be adjusted by means of a set screw 43 which passes through a threaded lug 44 on the reinforcing block 31 and which is locked in adjusted position by means of a nut 46. A second boss 47 is welded to the under side of the locking member 28 in such position that the handle operating spring aids the spring 39. When the locking member is in coupled position, the lug 47 is adjacent the flange 24.

At 48 we show an operating lever which is pivotally mounted at 49 to the under side of the plate 12. The operating lever 48 extends outwardly of the fifth wheel through a slot 51 in the outer flange 23. It is biased toward the position shown in Fig. 2 of the drawing by means of a spring 52 which is secured to the lever and anchored at 53 to the under side of the plate 12. The spring 53 also aids in moving the locking member 28 to coupled position by engagement of the lever 48 with the lug 47 should the locking member hang or the spring 39 fail to move it to coupled position. A cam member 54 carried by the operating lever 48 extends through the openings 26 and 27 in the flange 24 (see Fig. 3) so that it lies across the U-shaped slot 22 in the path of the king pin 11 when coupling. At such times, the king pin 11 strikes the cam member moving it out of the slot and swinging the lever 48 to uncoupled position. In its travel, the lever 48 first strikes the end of the rod 41 on the wedge member 29, moving it out of the way, and then strikes the end of the rod 38 on the locking member 28, thus moving the wedging member and the locking member out of the slot 21, permitting the king pin to pass into the inner end of the U-shaped slot 22. The springs 39 and 42 then return the locking member 28 and wedging member 29 to coupled position.

In order to prevent accidental displacement of the wedging member 29 in operation, we provide a pin 56 in the side thereof which protrudes into an elongated slot 57 in the side of the locking member. Thus should the wedging member work loose and move toward uncoupled position the pin 56 engages the end of the slot and the action of the three springs 39, 42 and 52 then serve to restrain it against further movement.

In Figure 5 we show a modified form of our invention. In accordance with this modification, we show the fifth wheel plate 12' with the lateral opening 21' terminating in an elongated central U-shaped opening 22'. A locking member 58 is mounted to move transversely of the opening 22' and retain the king pin when coupled. A reinforcing block 59, mounted on the under side of the fifth wheel plate serves as an abutment for the locking member 58. As in the previous modification, we weld a rod 61 onto the locking member to protrude below it and to extend outwardly of the fifth wheel plate through the reinforcing flange 23'. The rod 61 is surrounded by a relatively heavy spring 62 which bears against the reinforcing flange 23' and biases the locking member toward coupled position. At 63 we show a second reinforcing block which is welded to the under side of the fifth wheel plate 12' and which is provided with an arcuate recess 64 having a radius longer than the radius of the inner end of the U-shaped opening 22'. Also, the center of the arc defining the recess 64 is laterally offset with respect to the center of the arc defining the inner end of the opening 22'. Mounted within the recess 64 is a wedge member 66 having an arcuate inner face 67 forming a seat for the king pin and an outer arcuate surface fitting the recess 64, thereby being narrower at its inner end than its outer end, whereby when it moves around the surface 64, it is moved toward the king pin, thereby taking up lost motion between it and the locking member 58.

The wedging member 66 and locking member 58 are operated by a common lever 68 which is pivotally mounted at 69, intermediate its ends and which passes outwardly of the fifth wheel plate through a slot in the reinforcing flange 23'. A link 71 connects the lever 68 to the wedge member 66 and, as shown, is connected to the lever 68 at a point relatively close to the pivot 69. The lever 68 extends inwardly a sufficient distance to provide a striking member 72 for engaging the inner end of the rod 61 to move the locking member 58 to uncoupled position. Should the spring 62 fail to move the locking member 58 back to coupled position, a lug 73 on the locking member is engaged by the striking end 72 of the lever 68 in its movement toward coupled position. A cam member 75 on the inner end of the lever 68 extends across the elongated opening 22' for the purpose of moving the locking member out of the way when coupling, as described in connection with the previous modification. A spring 74 biases the lever 68 toward coupled position and a set screw 76 limits the movement of the lever toward coupled position and also limits the wedging action of the member 66.

From the foregoing, it will be apparent that we have devised an improved trailer coupling mechanism which is simple and sturdy of design and reliable in operation and one in which there is a minimum of lost motion between the king pin and the locking member.

While we have shown our invention in but two forms, it will be obvious to those skilled in the art that it is not so limited, but is susceptible of various other changes and modifications, without departing from the spirit thereof, and we desire, therefore, that only such limitations shall be placed thereupon as are specifically set forth in the appended claims.

What we claim is:

1. In a trailer coupler, a fifth wheel comprising a plate having a radial opening terminating in a slot for receiving a king pin, a locking member movable across the slot to retain the king pin when coupled, a wedging member for limiting relative motion between the king pin and the locking member, and operating means on the fifth wheel disposed to engage the locking member and move it out of the path of the king pin and concomitantly therewith to move the wedging member out of wedging position.

2. In a trailer coupler, a plate having a radial opening terminating in a slot for receiving a king pin, a locking member movable across the slot to retain the king pin when coupled, a wedging member for limiting relative motion between the king pin and the locking member, and lever means operable to move first the wedging member and then the locking member in succession to uncoupled position.

3. In a trailer coupler, a plate having a radial opening terminating in a slot for receiving a king pin, a locking member movable across the slot to retain the king pin when coupled, a wedging member for limiting relative motion between the king pin and the locking member, lever means disposed to move first the wedging member and then the locking member in succession to uncoupled position, and a member extending into the slot to be engaged by the king pin in coupling to move the locking member out of the slot.

4. In a trailer coupler, a plate having a radial opening terminating in a slot for receiving a king pin, a locking member movable across the slot to retain the king pin when coupled, a wedging member for limiting relative motion between the king pin and the locking member, a common operating lever disposed to move the wedging member and then the locking member in succession to uncoupled position, and spring means for biasing the locking member and the wedging member toward coupled position.

5. In a trailer coupler, a plate having a radial opening terminating in a slot for receiving a king pin, a locking member movable across the slot to retain the king pin when coupled, a wedging member for limiting relative motion between the king pin and the locking member, a common operating lever disposed to move first the wedging member and then the locking member in succession to uncoupled position, and a boss on the locking member in position to be engaged by the operating lever in moving to coupled position.

6. In a trailer coupler, a fifth wheel plate having a radial opening terminating in a slot for receiving a king pin, a reinforcing flange for the slot having openings therein, a locking member mounted in the openings and movable transversely of the slot to retain the king pin when coupled, a wedging member cooperating with the locking member to limit relative movement between the king pin and the locking member, spring means for biasing the locking member and the wedging member toward coupled position, and lever means for moving the wedging member and the locking member to uncoupled position.

7. In a trailer coupler, a fifth wheel plate having a radial opening terminating in a slot for receiving a king pin, a reinforcing flange for the slot having openings therein, a locking member mounted in the openings and movable transversely of the slot to retain the king pin when coupled, a wedging member mounted within the opening alongside the locking member and adapted to limit relative movement between the locking member and the king pin, a common operating lever pivotally mounted in the fifth wheel plate to swing over the wedging member and the locking member, a boss on the wedging member disposed to be engaged by the lever to move the wedging member out of engagement with the locking member, and a second boss on the locking member in position to be engaged by the lever after the wedging member has been moved, to move the locking member clear of the slot.

8. Apparatus as defined in claim 7 in which there is provided a cam member on the operating lever which lies across the slot in the path of the king pin when coupling to be engaged thereby and move the lever with the locking member and wedge member to uncoupled position.

9. Apparatus as defined in claim 7 in which the locking member is provided with an elongated slot in the side adjacent the wedging member, and a pin is mounted in the wedging member and protruding into the slot.

10. In a trailer coupler, a fifth wheel plate having a radial opening terminating in a slot for receiving a king pin, a reinforcing flange for the slot having openings therein, a locking member mounted in the openings and movable transversely of the slot to retain the king pin when coupled, a wedging member mounted within the opening alongside the locking member and adapted to limit relative movement between the locking member and the king pin, a common operating lever pivotally mounted in the fifth wheel plate to swing across the wedging member and the locking member, a boss on the wedging member disposed to be engaged by the lever to move the wedging member out of engagement with the locking member, a second boss on the locking member in position to be engaged by the lever after the wedging member has been moved, to move the locking member clear of the slot, and spring means for moving the locking member and the wedging member to coupled position.

11. In a trailer coupler, a fifth wheel plate having a radial opening and terminating in a slot for receiving a king pin, a reinforcing flange for the slot having openings therein, a locking member mounted in the openings and movable transversely of the slot to retain the king pin when coupled, a wedging member mounted within the openings alongside the locking member and adapted to limit relative movement between the locking member and the king pin, a common operating lever pivotally mounted in the fifth wheel plate to swing across the wedging member and the locking member, a boss on the wedging member disposed to be engaged by the lever to move the wedging member out of engagement with the locking member, a second boss on the locking member in position to be engaged by the lever after the wedging member has been moved, to move the locking member clear of the slot, means for moving the locking member and the wedging member to coupled position, a spring for biasing the operating lever toward coupled position, and a boss on the locking member disposed to be engaged by the lever as it moves toward coupled position.

12. In the trailer coupler, a fifth wheel plate having a radial opening terminating in a central slot for receiving a king pin, a reinforcing flange for the slot having lateral openings therein, a locking member mounted in the openings and movable transversely of the slot to retain the king pin when coupled, a wedging member mounted within the opening alongside the locking member and adapted to limit relative movement between the locking member and the king pin, a common operating lever pivotally mounted in the fifth wheel plate to swing over the wedging member and the locking member, a boss on the wedging member disposed to be engaged by the lever to move the wedging member out of engagement with the locking member, a second boss on the locking member in position to be engaged by the lever after the wedging member has been moved, to move the locking member clear of the slot, spring means for moving the locking member and the wedging member to coupled position, and adjustable means to limit the wedging action of the wedging member.

13. In a trailer coupler, a fifth wheel plate having a radial opening terminating at the center in a U-shaped slot for receiving a king pin, a locking member mounted to move transversely of the slot to retain the king pin when coupled, a wedging member mounted in the end of the slot opposite the locking member, an arcuate bearing block for the wedging member, an operating lever pivotally mounted on the fifth wheel plate and operatively connected to the wedging member to move it toward and away from engagement with the king pin, a boss on the locking member in the path of the operating lever for moving the locking member to uncoupled position after the wedging member has been moved, and spring means for biasing the locking member toward coupled position.

14. Apparatus as defined in claim 13 in which the bearing surface of the bearing block defines an arc having a radius greater than that for the end of the U-shaped slot and has its center laterally offset with respect to the center of the slot.

15. Apparatus as defined in claim 13 in which the operating lever is pivotally mounted intermediate its ends, the wedging member is connected to the operating lever by a link relatively close to the pivot point, and the locking member is engaged by the operating lever remote from the pivot point.

16. In a trailer coupler, a fifth wheel plate having a radial opening terminating at the center in a U-shaped slot for receiving a king pin, a locking member mounted to move transversely of the slot to retain the king pin when coupled, a wedging member mounted in the end of the slot opposite the locking member, an arcuate bearing block for the wedging member, an operating lever pivotally mounted on the fifth wheel plate and operatively connected to the wedging member to move it toward and away from engagement with the king pin, a boss on the locking member in the path of the operating lever for moving the locking member to uncoupled position after the wedging member has been moved, a member carried by the operating lever and overhanging the slot in position to be engaged by the king pin when coupling to move the operating lever and the locking member out of the path of the king pin, and spring means for biasing the locking member toward coupled position.

17. In a trailer coupler, a fifth wheel plate having a radial opening terminating in a U-shaped slot for receiving a king pin, a locking member mounted to move transversely of the slot to retain the king pin when coupled, a wedging member mounted in the end of the slot opposite the locking member, an arcuate bearing block for the wedging member, an operating lever pivotally mounted on the fifth wheel and operatively connected to the wedging member to move it toward and away from engagement with the king pin, a boss on the locking member in the path of the operating lever for moving the locking member to uncoupled position after the wedging member has been moved, a cam on the operating lever overhanging the slot in position to be engaged by the king pin when coupling to move the operating lever and the locking member out of the path of the king pin, spring means for biasing the locking member toward coupled position, a second boss on the locking member in position to be engaged by the operating lever as it moves toward coupled position, and a spring for biasing the operating lever toward coupled position.

18. In a trailer coupling mechanism including a king pin and a locking member for retaining the king pin when coupled, a wedge member for taking up lost motion between the king pin and the locking member, biasing means for maintaining the wedge member in engagement with the locking member, and a cam member operatively connected to the wedge member and the locking member and disposed in the path of movement of the king pin when coupling to move the wedge member and the locking member out of the way of the king pin.

JOHN P. K. FONTAINE.
ARNOLDUS S. BRUMBY.

REFERENCES CITED

The following references are of record in the file of this patent:

UNITED STATES PATENTS

| Number | Name | Date |
|---|---|---|
| 2,102,821 | Seyferth | Dec. 21, 1937 |